United States Patent [19]

Vitins

[11] Patent Number: 4,618,933
[45] Date of Patent: Oct. 21, 1986

[54] METHOD FOR DETECTING A FAULT OR ALSO THE DIRECTION OF A FAULT IN ELECTRIC LINES AND MEANS FOR EXECUTING THIS METHOD

[75] Inventor: Michael Vitins, Zürich, Switzerland

[73] Assignee: BBC Brown, Boveri & Company Limited, Baden, Switzerland

[21] Appl. No.: 506,410

[22] Filed: Jun. 21, 1983

[30] Foreign Application Priority Data

Jun. 23, 1982 [CH] Switzerland ............... 3836/82

[51] Int. Cl.$^4$ .................. G06F 15/20; G01R 31/08
[52] U.S. Cl. .......................... 364/481; 324/52; 361/18; 361/82; 364/483; 364/492
[58] Field of Search ............ 364/480, 481, 483, 492; 361/18, 42, 65, 79; 340/657; 324/51, 52

[56] References Cited

U.S. PATENT DOCUMENTS

| | | | |
|---|---|---|---|
| 3,931,502 | 1/1976 | Kohlas | 364/481 X |
| 3,983,377 | 9/1976 | Vitins | 364/481 |
| 4,107,778 | 8/1978 | Nii et al. | 364/483 X |
| 4,156,280 | 5/1979 | Griess | 364/481 |
| 4,287,547 | 9/1981 | Vitins | 361/82 |
| 4,466,071 | 8/1984 | Russell, Jr. | 364/481 X |

OTHER PUBLICATIONS

IEEE Power Engineering Meeting, Jul. 13–18, 1980, "A Microcomputer Based Ultra Highspeed Distance Relay", Phadke et al., pp. 1–8.

*Primary Examiner*—Errol A. Krass
*Assistant Examiner*—Kevin J. Teska
*Attorney, Agent, or Firm*—Oblon, Fisher, Spivak, McClelland & Maier

[57] ABSTRACT

A method and apparatus for detecting a fault and also the direction of a fault in electric lines, wherein voltage (Su) and current step signals (Si) corresponding to the transient components in the line voltage and line current are derived; the instantaneous values of these step signals (Su, Si) define, in a co-ordinate system formed by the step signals (Su, Si) themselves, a point which passes through a line of motion (B) after the occurrence of a fault; and if the point transgresses a triggering boundary (AI, AII, AIII, AIV) in the co-ordinate system the fault is detected. In this event the direction of the fault is found from the quadrant (QI, QII, QIII, QIV) in which the transgression takes place. At a predetermined time after entry of the point into a boundary zone provided in one quadrant, located in the line of motion ahead of a triggering boundary in next adjacent quadrant, a triggering boundary in at least the next adjacent quadrant is adjusted to a greater distance from the origin of the co-ordinate system which is located in the same semicircular space bounded by the axis of the voltage step signal (Su). This measure considerably increases the reliability of detection with respect to fault direction and, in addition, reduces the time required for fault detection.

12 Claims, 7 Drawing Figures

METHOD FOR DETECTING A FAULT OR ALSO THE DIRECTION OF A FAULT IN ELECTRIC LINES AND MEANS FOR EXECUTING THIS METHOD

BACKGROUND OF THE INVENTION

The invention relates to a method and apparatus for detecting a fault and also the direction of a fault in electric lines.

FIELD OF THE INVENTION

During each switching process in an electric power supply system and particularly during the occurrence of a fault, for example of a short circuit on a line, a transient wave, which has its origin at the switching or at the fault location, propagates through the power supply system. At any test location in the power supply system, the switching process or the fault is indicated by the occurrence, with a time delay which is a function of the transit time of the transient wave from the switching or fault location to the test location, in each case of a transient component in the line voltage and the line current. Voltage and current signals corresponding to these can be derived, for example by means of instrument transformers, from the line voltage and the line current. If in each case the transient component is separated out from the voltage and the current signal, for example by subtracting the steady-state operating frequency component, a voltage and a current step signal is obtained. The instantaneous values of these step signals define as the co-ordinates in a Cartesian co-ordinate system formed by hemselves, a point which, with time, runs through a line of motion starting from the origin of this co-ordinate system. The switching process or the fault can be detected by monitoring the point for transgressions of triggering boundaries within this co-ordinate system, for example by comparing the instantaneous values of one of the step signals with a boundary value which depends on the instantaneous values of the respective other step signal. The direction from test location to switching or fault location can in this arrangement be derived from the type of quadrant in which the transgression of a triggering boundary occurs (quadrant criterion). A uniform fault direction is determined by respectively diagonally opposite quadrants. Since the line of motion generally reaches a greater distance from the origin with a fault than with a normal switching process or, in the case of a multi-phase system, with faults on adjacent phases, the switching processes and the faults on other phases can be distinguished from the direct faults by means of triggering boundaries which have a suitable distance from the origin. The total time required for detecting a fault is only a fraction of one system period. This is why the method described finds preferred use in extra high voltage systems in which the prevention of damage to the generally very expensive system components depends on faults being detected as rapidly as possible.

A method of the type described has been disclosed (German Auslegeschrift 2,841,009) in which higher harmonics contained in the step signals are suppressed by filtering during the process of deriving the step signals. The consequence of the presence of higher harmonics in the step signals is that the point defined by the instantaneous values of the step signals in the Cartesian co-ordinate system formed by the step signals fluctuates widely. As a result of this fluctuation, the point can exceed one of the triggering boundaries even though its mean line of motion does not exceed this triggering boundary. These fluctuations are critical in the case of faults occurring shortly after a line voltage maximum. With these faults, the mean line of motion of the point runs through two adjacent quadrants of the coordinate system at a distance from the triggering boundaries which is in some cases very small, and exceeds one of these triggering boundaries only in a third quadrant. In this case, a transgression as a function of fluctuations and occurring in the second and center quadrant passed through would lead to a false fault direction decision. In the known solution for this problem, which is to dampen the fluctuations by suppressing the higher harmonics in the step signals, however, the time for fault detection is extended.

SUMMARY OF THE INVENTION

Accordingly, a primary object of this invention is to provide a novel method and apparatus for detecting a fault and fault direction in electric lines wherein fault direction decisions are always reliably guaranteed on the basis of the quadrant criterion.

This and other objects are achieved according to the invention by providing a novel method and apparatus for detecting a fault and also the direction of a fault in electric lines, wherein a triggering signal is generated if in a Cartesian coordinate system, one-co-ordinate of which corresponds to voltage step signals and the other coordinate of which corresponds to current steps signals, a point defined by these step signals describes a line of motion which trangresses triggering boundaries, wherein boundary zones are located ahead of the triggering boundaries and for the purpose of preventing erroneous signals at least the triggering boundary of the next adjacent quadrant passed through in the direction of the line of motion is displaced.

It is accordingly essential for the solution according to the invention to record the entry of the point into a boundary zone which, seen from the origin, is located ahead of a triggering boundary in a first quadrant of the co-ordinate system. At a predeterminable time after such recording triggering boundary is adjusted, at least in sections for a greater distance to the origin of the co-ordinate system, in the second quadrant which adjoins the first quadrant. This adjustment is made at least in the sense of the direction of movement of the mean line of motion of the point. As a result, the mean line of motion of faults occurring in each case shortly after a maximum in the line voltage passes through three adjoining quadrants, as explained, in the middle one of these quadrants a greater safety margin between the triggering boundary and the line of motion of the point is produced and thus the reliability of the fault direction decision is decisively increased in the case of the faults mentioned. However, the greater safety margin between the triggering boundary and the mean line of motion of the point in the middle one of the three quadrants also results in that a greater margin of play is available for the fluctuations of the point. This largely eliminates the need for damping the fluctuations by suppressing the higher harmonics in the step signals which advantageously allows the time for fault detection to be shortened.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the figures, identical parts are designated by identical symbols.

Figure 1A:
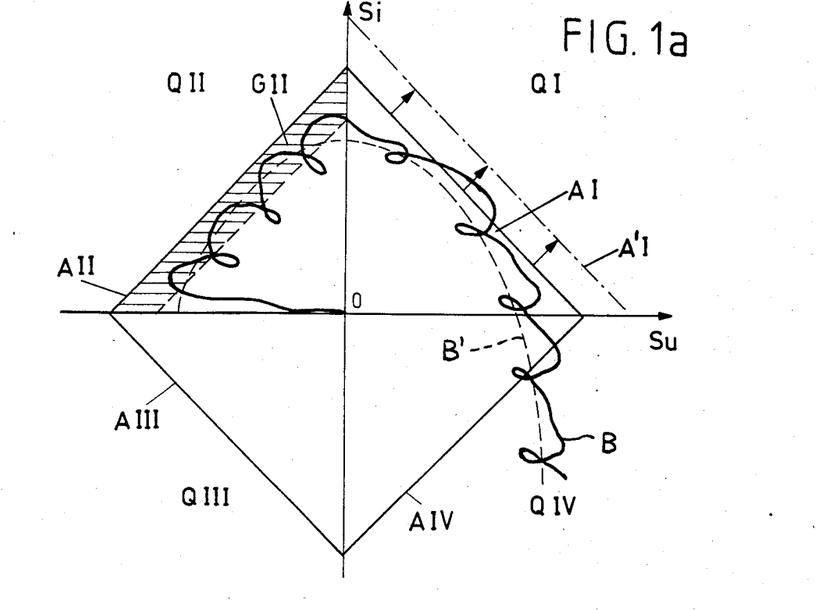
FIG. 1a, b each are illustrations of a co-ordinate system formed by one voltage and one current step signal, the coordinate system showing a line of motion and the predetermined triggering boundaries, with the boundary zones, according to the invention, placed ahead of the line of motion.
Figure 1B:
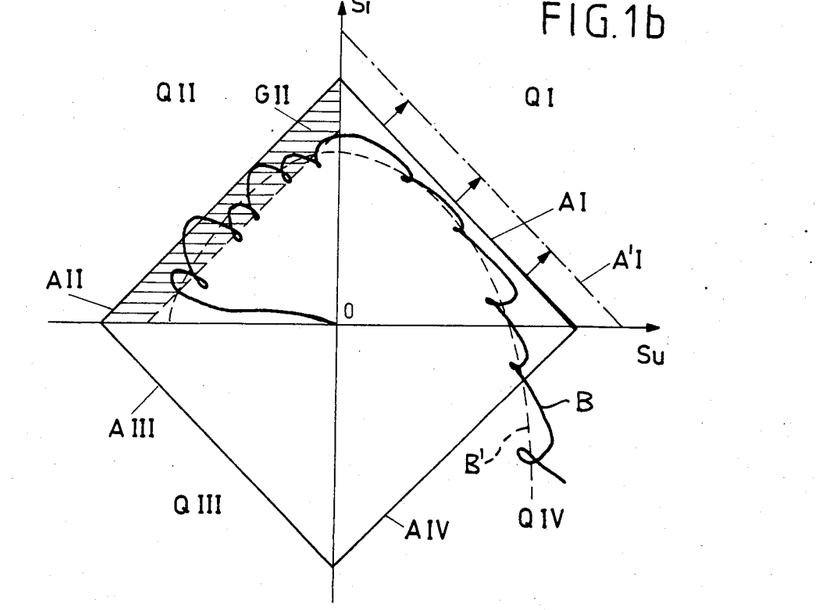

Referring now to the drawings, wherein like reference numerals designate identical or corresponding parts throughout the several views, and more particularly to FIGS. 1a and 1b thereof, in each case a Cartesian co-ordinate system is shown which is formed by a voltage step signal Su as the abscissa and a current step signal Si as the ordinate. In this co-ordinate system in each case a motion line B of the point defined in this co-ordinate system by the instantaneous values of the step signals Su, Si is plotted for a fault which has occurred shortly after a maximum in the line voltage. As a result of the influence of the higher harmonics in the step signals Su, Si, this line of motion B fluctuates around a mean line of motion B' which is represented in FIG. 1a and FIG. 1b in each case by a broken line. In addition, FIG. 1a and FIG. 1b show in each quadrant QI, QII, QIII, QIV of the co-ordinate system in each case a triggering boundary AI, AII, AIII, AIV. If the point or its line of motion B transgresses one of these triggering boundaries AI, AII, AIII, AIV, a fault is detected. If this transgression takes place in quadrant QII, or QIV, for example, a forward fault is detected and if the transgression takes place in quadrant QI or QIII, a reverse fault is correspondingly detected. Forward and reverse fault locations are situated on both sides of the test location. In the case of a fault which, as in the example of FIGS. 1a and 1b, has occurred shortly after a maximum in the line voltage and the mean line of motion B', as drawn, passes initially through two quadrants QII, QI without transgressing triggering boundaries AII, AI and transgresses such a boundary (AIV) only in a third quadrant QIV, it can nevertheless happen as a result of the effect of the fluctuations that a transgression of one of the triggering boundaries occurs in the first quadrant QII or in the second quadrant QI of the three quadrants QII, QI, QIV passed through. In the latter case, shown in FIG. 1a, instead of a forward fault corresponding to a transgression of the triggering boundary AIV in quadrant QIV, a reverse fault would be erroneously detected. A trangression occurring as a result of the fluctuations in the first QII of the three quadrants QII, QI, QIV passed through, as shown in FIG. 1b, is on the other hand harmless since this quadrant corresponds to the same fault direction as the opposite third quadrant QIV passed through, as explained. Thus the danger of a false fault direction determination as a result of the fluctuations exists only in the middle quadrant QI of the three quadrants QII, QI, QIV passed through. In order to prevent a transgression of the triggering boundary AI in this middle quadrant QI as a result of the fluctuations, according to the invention, the triggering boundary AI is adjusted in this middle quadrant QI to a greater distance from the origin O. As a criterion for this adjustment, the entry of the point into a boundary zone GII is analyzed, which boundary zone is located in the first quadrant QII passed through ahead of the triggering boundary AII seen from the origin O. The middle quadrant QI, in which the adjustment takes place, is located in each case, together with the quadrant QII passed through first, on the same side of the co-ordinate axis formed by the voltage step signal Su. The adjustment can be carried out at a predeterminable time after the point has entered into the boundary zone GII and preferably when the point is leaving the boundary zone GII again. Naturally, no adjustment needs to be made if the point leaves the boundary zone GII via the associated triggering boundary AII. The triggering boundary AI also does not need to be adjusted over its whole length to a greater distance from the origin O in the middle one, QI, of the quadrants passed through. An adjustment in sections of the triggering boundary AI to a greater distance or an adjustment in sections to different distances to the origin O is sufficient. According to a preferred embodiment of the invention, the triggering boundaries AI, AIII and AII, AIV of in each case opposite quadrants QI, QIII, and QII, QIV are jointly adjusted to a greater distance to the origin O which further increases reliability of detection. The depth of the boundary zone GII located ahead of a triggering boundary AII and the factor by which a triggering boundary AI is in each case adjusted to a greater distance to the origin O of the co-ordinate system is preferably a function of the strength of the permitted fluctuations. If the depth of a boundary zone GII located ahead of a triggering boundary AII is measured from any point on the triggering boundary AII in the direction to the origin O of the co-ordinate system, for example a fixed value of between 5% and 50% of the distance of the respective point from the original O can be selected for the depth of the boundary zone GII determined in this manner. On the other hand, the depth of the boundary zone GII along the respective triggering boundary AII measured at rightangles to this triggering boundary AII can be selected to be uniform. The above-mentioned factor can be, for example, a value of between 1.05 and 2.

Advantageously, boundary zones and a possibility for adjusting triggering boundaries to a greater distance from the origin should be provided uniformly in all four quadrants of the co-ordinate system so that all types of faults can be dealt with in the same manner. For reasons of clarity, FIG. 1 shows only one boundary zone in the second quadrant and a switched triggering boundary in the first quadrant.

Figure 2:
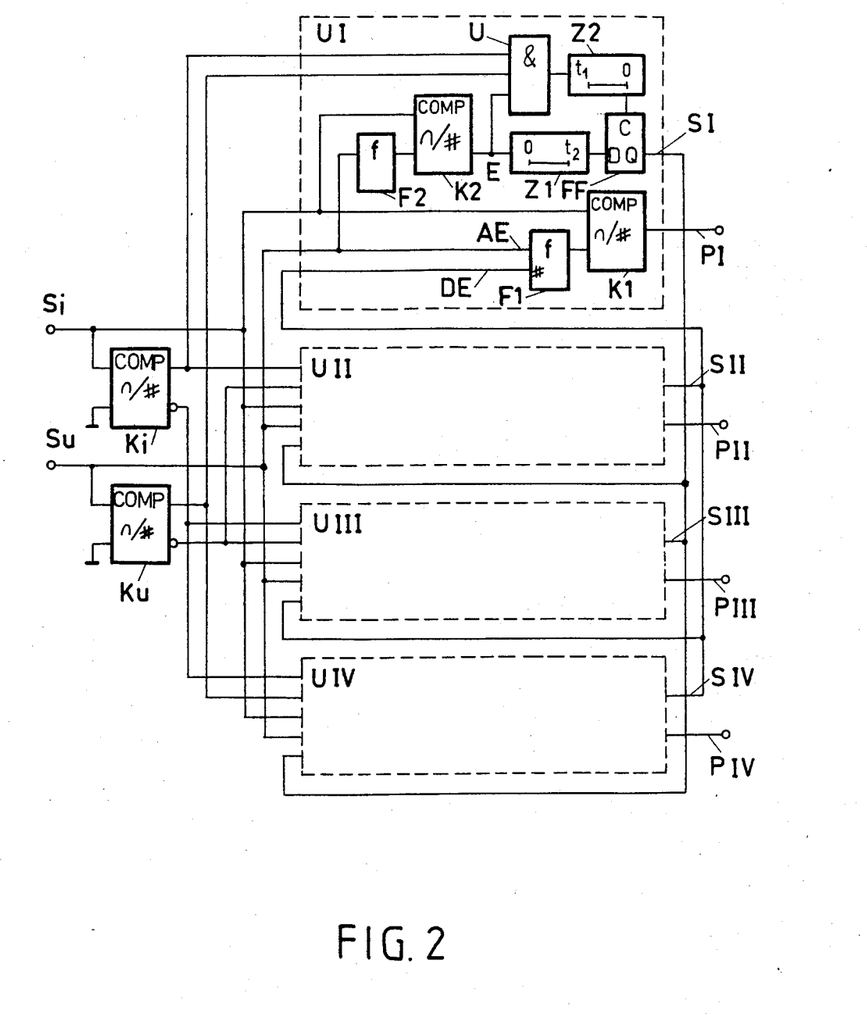
FIG. 2 is a block diagram of a circuit for executing the method according to the invention.

FIG. 2 shows a circuit used as a means of executing the method according to the invention. This circuit includes four identical monitoring circuits UI, UII, UIII, UIV, each of which monitors in respective quadrant QI, QII, QIII, QIV of the co-ordinate system the point or its line of motion B for transgression of the respective triggering boundary AI, AII, AIII, AIV and in this event generates a triggering signal PI, PII, PIII or PIV. In addition, each of the monitoring circuits UI, UII, UIII, UIV monitors the point or its line of motion B for entry into the boundary zone GII, etc., located ahead of the respective triggering boundaries, AII, etc., or for re-emergence from these boundary zones and in this event generates an adjusting signal, SI, SII, SIII or SIV which is used for adjusting the triggering boundary AI or the triggering boundaries AI, AIII in the respective adjoining quadrant or quadrants QI, QIII.

To the monitoring circuits UI, UII, UIII, UIV the voltage Su and the current step signal Si are applied. In each of the monitoring circuits UI, UII, UIII, UIV, the voltage step signal Su is connected via a first function generator F1 to one inputs of a first comparator K1. Current step signal Si is connected to a second input of K1. The first function generator F1 generates from the voltage step signal Su an output signal which is related to this voltage step signal in accordance with a predetermined function corresponding to the mathemathical function of the respective triggering boundary AI, AII, AIII, AIV. At the binary output of the first comparator K1 in each case a logical "1" fault signal is produced if the current step signal Si becomes absolutely greater than the output signal of the first function generator F1, that is to say the point transgresses the predetermined triggering boundary AI, AII, AIII, AIV. In exactly the same manner, a second comparator K2 and a second function generator F2 are used to monitor the entry of the point into the boundary zone GII located in each case ahead of the triggering boundary AII and to generate in this event a binary entry signal E which is a logical "1". The function predetermined in the second function generator F2 in each case corresponds to the mathematical form of the boundary which, next to the triggering boundary AII, limits the boundary zone GII. The entry signal E is connected via a first time delay section Z1 having a predetermined decay delay t2 to the D input of a D flip flop FF and to a first input of an AND gate U. A second and a third input of this AND gate U are in each case connected to the outputs or the inverted outputs, respectively, of a third comparator Ki and fourth comparator Ku jointly preceding the four monitoring circuits UI, UII, UIII, UIV. The third comparator Ki then generates at its output a logical "1" when the current step signal Si is positive and a logical "0" when it is negative. At the inverted output of the third comparator Ki the logical states appear in the exactly opposite sense. The equivalent applies to the fourth comparator to which the voltage step signal Su is applied. The monitoring circuits UI, UII, UIII, UIV are connected to the outputs or inverted outputs of the third comparator Ki and fourth comparator Ku in such a manner that a logical "1" always appears on both of the lines applied to a particular monitoring circuit only when the point happens to be located in the quadrant QI, QII, QIII or, QIV associated with the respective monitoring circuit UI, UII, UIII, UIV. If the point is located, for example, in quadrant UI a logical "1" is in each case present at the second and third input of the AND gate U in the monitoring circuit UI. In the remaining monitoring circuits UII, UIII, UIV, on the other hand, a logical "0" is present at at least one of the two second and third inputs of the respective AND gate U. Thus the third and fourth comparator Ki, Ku together form a sign logic.

From the output of the AND gate U in all monitoring circuits UI, UII, UIII, UIV either directly or via a second time delay section Z2 the clock input of the D flip flop FF is supplied which generates at its output Q in each case the adjusting signal SI, SII, SIII, SIV. Correspondingly, the output Q of the D flip flop FF in the monitoring circuit UI is connected to one digital adjusting input DE each of the first function generator F1 in the monitoring circuit UIV and UII. The output of the D flip flop FF in the monitoring circuit UII is in each case connected to a digital adjusting inpput DE of the first function generator F1 in the monitoring circuit UIII and UI; the output of the D flip flop FF in the monitoring circuit UIII is in each case connected to a digital adjusting input DE of the first function generator F1 in the monitoring circuit UIV and UII and the output of the D flip flop FF in the monitoring circuit UIV is in each case connected to a digital adjusting input DE of the first function generator F1 in the monitoring circuit UIII and UI.

The adjusting signal SI, SII, SIII, SIV present at the digital adjusting input DE of the first function generator F1 in each case causes the function predetermined in the first function generator F1 to be adjusted to a different function corresponding to the mathematical form of the triggering boundary A'I, A'II, A'III, A'IV with a distance from origin O which is greater at least in sections.

The time at which the adjustment of the first function generator F1 takes place in each case is determined by the characteristics of the clock input C at the D flip flop FF. If this input is a dynamic input at which only a change of the logic state at the output of the AND gate U from "0" to the "1" is effective, the adjusting signal SI, SII, SIII, SIV appears, provided there is no second time delay section Z2, simultaneously with the signal which is the last one to go from "0" to "1" at the input of the AND gate U. According to the preceding explanation, this means that the adjusting signal SI, SII, SIII, SIV appears when the point enters the boundary zone GII located ahead of the triggering boundary AII in the respective quadrant QII.

If the second time delay section Z2 is present and if a rise-time delay t1 has been predetermined, the adjusting signal SI, SII, SIII, SIV appears delayed by the predetermined delay time after entry of the point into the boundary zone GII located ahead of the triggering boundary AII in the respective quadrant QII.

If the clock input C at the D flip flop FF, on the other hand, is a dynamic input with negation in which only a change of the logic state at the output of the AND gate U from "1" to "0" is effective, the adjusting signal SI, SII, SIII, SIV appears simultaneously with the signal which is the first one to go from "1" to "0" at the input of the AND gate U before which all these signals must have been at "1". According to the preceding explanation this means that the adjusting signal SI, SII, SIII, SIV appears when the point is re-emerging from the boundary zone GII located ahead of the triggering boundary AII in the respective quadrant QII.

Figure 3:
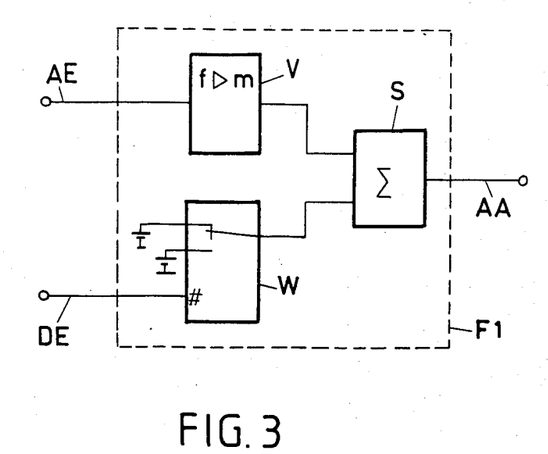
FIG. 3 is a block diagram example of the first function generator contained in the circuit of FIG. 2.

FIG. 3 shows an example of the configuration of the first function generator F1 contained in the circuit arrangement of FIG. 2. The voltage step signal Su is applied in each case to the analog input AE of the function generator F1. This voltage step signal is amplified by an amplifier V by a positive or negative factor m and then added in a summing section S to a constant signal level, which has been tapped off for example at a voltage source, and is then supplied to the analog output AA of the function generator. The constant signal level can be adjusted to at least two different values by a changing section W. The changing section W is actuated via a digital input DE which corresponds to the adjusting input of the function generator F1. Function generators F1 configured in this way supply linear triggering boundaries such as are shown, for example, in FIG. 1.

Figure 4:
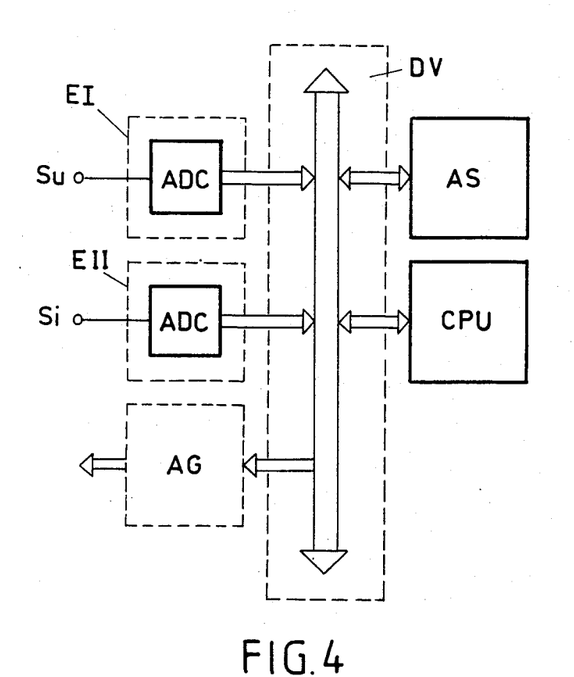
FIG. 4 is a block chart of a process computer system.

FIG. 4 shows a block diagram of a process computer system which has a first input unit EI to which the voltage step signals Su are applied and a second input unit EII to which the current step signals Si are applied. Each of these input units EI, EII consists, for example, of an analog/digital converter ADC which samples, digitizes and temporarily stores the instantaneous analog values of the step signals Su, Si. From the input units EI, EII the input data, the digitized instanstaneous values of the step signals Su, Si, are transferred via a data link DV into a main memory AS. This main memory AS can be accessed by the central processing unit CPU of the process computer system, for example again via the data link DV. The central processing unit CPU also checks and controls via control units and control lines, which are a part of the data link DV, the whole data flow in the process computer system. In addition, at least one output unit AG is connected to the data link DV.

Process computer systems of the type described and all their components and all programs necessary for operating them are state of the art (see for example CAMAC, "A modular instrumentation system for data handling", Euratom Report No. EUR 4100e) and are available on the market. The only requirement to be made of the process computer system is that it is able to process a data rate of some kilohertz which makes it possible to meet the requirements of the sampling theorem for the step signals. For example, the process computer system should be able to process a data rate of at least 1 KHz. A data rate of 10 KHz may be reached with fast process computer systems commercially available. In order to be able to execute the method according to the invention by means of a process computer system, however, a new computer program must be generated. This computer program must read the instantaneous digital values, stored in the main memory AS, for example in a file, of the step signals Su, Si, execute with these values the individual steps of the method according to the invention, form output values which correspond to the triggering signals PI, PII, PIII, PIV of the circuit arrangement already described and write these values back into the main memory AS, again into a file. From the main memory AS, the output values can then be supplied via the data link DV and the output unit AG to external units such as a triggering circuit.

An example of such a computer program is given below in the programming language PASCAL. A description of PASCAL can be found, among others, in "Pascal-Systematische Darstellung von Pascal und Concurrent Pascal für Anwender" (Pascal-Systematic description of Pascal and Concurrent Pascal for users) by Rudolf Herschel & Friedrich Pieper, R. Oldenburg Verlag, Munich, Vienna, (1981).

```
"program fault_detection (data, data);
```

```
type
signal = integer;
section = record
quadrant : integer;
level : integer
end;
mode = (normal, a_switched, b_switched);
direction = none, forward, reverse);
data = record
voltage : integer;
current : integer
end:
filein = file of data;
fileout = file of direction;
var
delta_u, delta_i : signal;
operation : mode;
old section, new_section : section;
fault : direction;
datain : filein;
dataout : fileout;
procedure determine_section (delta_u, delta_i : signal;
                             var new_section : section);
const
r = <integer value>;
c = array [10..3] of (0,<integer_value>,<integer_value>,
                      <integer_value>);
var
k, a, b : integer;
begin (*determine_section*)
with new_section do
begin
if delta_i> = 0 then
if delta_u> = 0 then quadrant := 1 else quadrant := 2
else if delta_u> = 0 then quadrant := 4 else quadrant := 3;
a := abs (r*delta_i + delta_u);
b := abs (r*delta_i - delta_u);
for k := 0 to 2 do
if (a> = c[k]) and (a<c [k+1]) and ((quadrant = 1) or
(quadrant = 3)) or (b> = [k]) and (b<c[k+1]) and
((quadrant = 2) or (quadrant = 4))
then level := k;
if (a = c[3]) or (b > = c[3]) then level := 3
end
end (*determine_section*);
procedure check_boundaries (old_section, new_section :
                             section;
                             var operation : mode;
                             var fault : direction);
var
q_old, q_new : integer;
begin (*check boundaries*)
q_old := old_section.quadrant;
q_new := new_section.quadrant;
if (old_section.level = 1) and (new_section.level = 1) then
begin
if ((q_old = 2) or (q_old = 4) and ((q_new = 1) or (q_new
= 3))
then operation := a_switched;
if ((q_old = 1) or (q_old = 3) and ((q_new = 2) or (q_new
= 4))
then operation := b_switched
end;
if (old section.level = 1) and (new_section.level = 0) then
begin
if q_old = q_new then
begin
if q_old = 1) or (q_old = 3) then operation := b_switched
else operation := a_switched
end
end;
if (old_section.level = 1) and (new_section.level = 2) then
begin
if (q_old = q_new) and (operation = normal) then
begin
if (q_old = 1) or (q_old = 3) then fault := reverse
else fault := forward
end;
if (old_section.level = 2) and (new_section.level = 3) then
begin
if (q_old = q new) and (operation   normal) then
begin
```

-continued
```
if ((q_old = 1) or (q_old = 3)) and (operation = a_switched)
then fault := reverse;
if ((q_old = 2) or (q_old = 4)) and (operation = b_switched)
then fault := forward
end
end;
if (old_section.level = 2) and (new_section.level = 2) then
begin
if ((q_old = 1) or (q_old = 3)) and ((q_new = 2) or q_new
 = 4))
and (operation = a_switched) then fault := forward;
if ((q_old = 2) or q_old = 4)) and ((q_new = 1) or (q_new
 = 3))
and (operation = b_switched) then fault := reverse
end
end (*check_bondaries*);
begin (*fault_detection*)
with old_section do
begin quadrant:= 1; level := 0 end;
operation := normal;
fault := none;
reset (datain);
while fault = none do
begin
get (datain);
delta_u := datain ↑ .voltage;
delta_i := datain ↑ .current;
determine_section (delta_u, delta_i, new section);
check_boundaries (old_section, new_section, operation,
fault);
old_section := new_section
end;
reset (dataout);
write (dataout, fault);
end (*fault detection*)."
```

Figure 5:
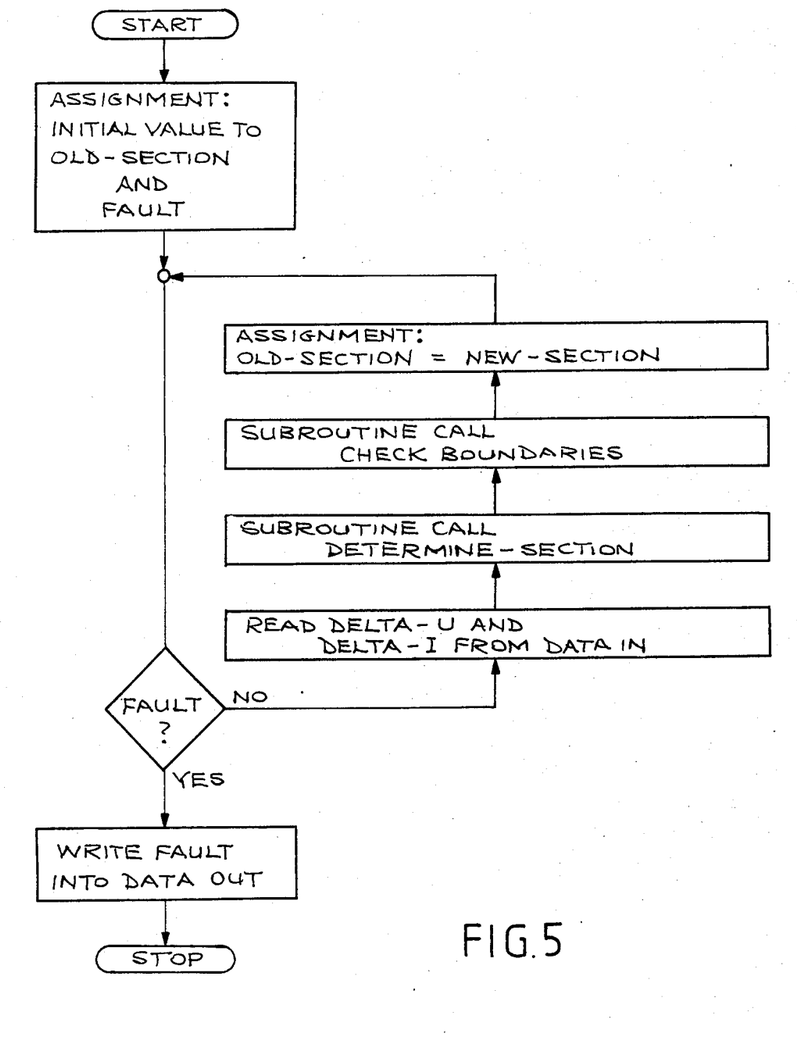
FIG. 5 shows a flow diagram of a computer program for executing the method according to the invention.
Figure 6:
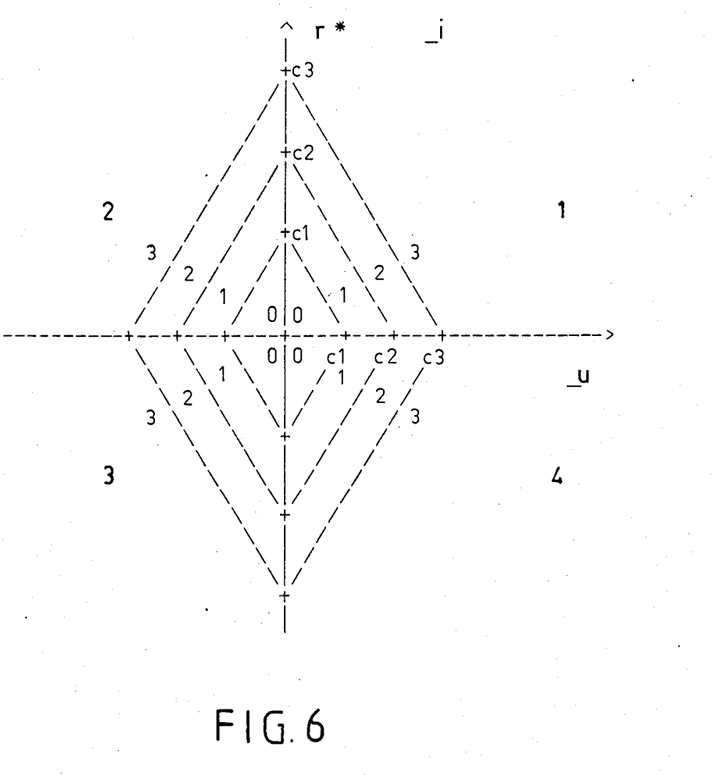
FIG. 6 is an illustration of a co-ordinate system as in FIG. 1 for explaining the computer program.

This program will be further explained with the aid of the flow chart of FIG. 5:

The instruction part of the program begins with an assignment of initial values to the variables "old-section", "operation" and "fault". The variable "old-section" describes in which quadrant and in which zone of FIGS. 1a, b or FIG. 6 respectively, the point defined by the current values of the step signals happens to be located. The variable "operation" describes whether a triggering boundary must be shifted or has been shifted, and in which way, and the variable "fault" describes if a fault is present and the direction of the fault. The initial value is assigned in such a way that a normal fault-free condition is used as the starting point for running the further program, the point being located in quadrant 1 in zone 0.

For this reason, the subsequent enquiry whether a fault is present or not mandatorily leads into the instruction block located in the right-hand branch of the flow diagram of FIG. 5. This leads in each case back to the fault enquiry in the form of a loop. In the instruction block, initially the current values of the step signals Su, Si represented in the program by the variables "delta-u", "delta-i" are read by a "data-in" file stored in the main memory AS. It must be assumed here that the current values of the step signals Su, Si have first been stored there by the process computer system as described.

The current values of the step signals Su, Si are then used to call up a subroutine called "determine section" which calculates in which quadrant and in which zone in the co-ordinate system the point defined by the current values of the step signals Su, Si is located. The result is assigned to a variable "new section". By comparing "old-section" with "new-section", another subroutine called "check boundaries" then determines if the point has changed quadrants or zones. From this the subroutine further calculates if a fault if present or if a triggering boundary has to be shifted. After that the program returns to fault enquiry and, in principle, can from here run via the instruction block as many times through the loop described as required. Before the values of the step signals Su, Si are again read in, however, it is necessary for these values to have been replaced by new and more current values in the meantime. This updating of the values of the step signals Su, Si can take place, for example, during a brief interruption of the program run before read-in and is controlled by the known higher-ranking operating system of the process computer system.

If during the fault enquiry run it is found, after the loop has been run through, that a fault is present, the program leaves the loop and follows an alternative path on which the value of the variable "fault" which describes the fault and the fault direction is written into the "dataout" file. This terminates the program.

Obviously, numerous modifications and variations of the present invention are possible in light of the above teachings. It is therefore to be understood that within the scope of the appended claims, the invention may be practiced otherwise than as specifically described herein.

I claim:

1. A method for detecting a fault and a fault direction in electric lines, comprising:
   simultaneously measuring voltage and current at at least one location in said electric lines and forming voltage and current step signals (Su, Si) based on said measuring;
   establishing a Cartesian coordinate system defining four quadrants and an origin, said coordinate system having one coordinate corresponding to said voltage step signal Su and another coordinate corresponding to said current step signal Si, wherein each pair of said simultaneously measured signals Su, Si forms a point in said coordinate system and said points define a line of motion progressing from one quadrant to a next adjacent quadrant;
   establishing predetermined triggering boundaries in each of said quadrants and establishing predetermined boundary zones to a predetermined depth from each triggering boundary toward said origin;
   monitoring progress of said line of motion relative to said triggering boundaries and said boundary zones;
   displacing the triggering boundary in said next adjacent quadrant upon a detection in said monitoring step that said line of motion has entered the boundary zone of said one quadrant;
   detecting a fault upon a detection in said monitoring step that said line of motion has transgressed a triggering boundary and detecting a fault direction based on the quadrants in which a fault detection is made; and
   generating a triggering signal upon a detection in said monitoring step that said line of motion has transgressed a triggering boundary.

2. A method according to claim 1, comprising:
   selecting the depth of said boundary zone in said one quadrant preceding said next adjacent quadrant as being, at least in sections, between 5% and 50% of the distance from any point of the triggering boundary of said one quadrant to the origin.

3. A method according to claim 1, comprising;

selecting the depth of the boundary zone of said one quadrant preceding said next quadrant as being constant, said constant depth being measured in each case at right angles to the triggering boundary of said one quadrant.

4. A method according to claim 1, wherein the displacing step comprises:
displacing the triggering boundary of said next adjacent quadrant passed through in the direction of the line of motion such that the line of motion extends below the displaced triggering boundary.

5. A method according to claim 4, further comprising:
displacing the triggering boundary, measured with respect to the origin of the coordinate system, away from the origin by 5% to 100% of the distance of the triggering boundary from the origin.

6. A method acording to claim 1, wherein the displacing step is performed immediately after entry of the point into the boundary zone of said one quadrant.

7. A method according to claim 1, wherein the displacing step is performed after the expiry of a predetermined period of time after the point has entered the boundary zone of said one quadrant.

8. A method according to claim 1, wherein the displacing step is performed immediately after emergence of the point from the boundary zone of said one quadrant.

9. A method according to claim 1, wherein the displacing step comprises:
displacing the triggering boundary of the quadrant diagonally opposite the next adjacent quadrant at least in sections, to a greater distance from the origin of the coordinate system.

10. An apparatus for detecting a fault and a fault direction in electric lines, wherein both the voltage and the current of the electric lines are successively sampled and respective voltage and current steps signals (Su, Si) generated at each sampling, each pair of said step signals (Su, Si) defining a point in a Cartesian coordinate system, said Cartesian coordinate system comprising four quadrants and an origin, and successive pairs of said steps signals (Su, Si) defining a line of motion progressing from one quadrant to a next adjacent quadrant, comprising:
monitoring means for monitoring in each of said quadrants the progression of the points defined by said step signals (Su, Si) from said one quadrant to said next adjacent quadrant, comprising,
first function generator means for establishing in each of said quadrants a triggering boundary,
first comparator means connected to said first function generator for producing a fault signal when a point defined by said step signals (Su, Si) transgresses the triggering boundary of any quadrant,
said first function generator means comprising displacement means for displacing at least a section of the triggering boundary at any one quadrant a predetermined distance in a direction away from the origin upon application of a displace control signal thereto,
second function generator means for establishing in each quadrant a boundary zone extending a predetermined depth from the triggering boundary of the respective quadrant to the origin,
second comparator means connected to said second function generator means for producing said displace control signal whenever a point defined by said step signals (Su, Si) enters into a boundary zone in any quadrant, said second comparator means connected to said displacement means of said first function generator means and applying said displace control signal to said displacement means to displace the triggering boundary of said next adjacent quadrant.

11. An apparatus according to claim 10, comprising;
a signal logic circuit to which the step signals (Su, Si) are applied and which is connected to the second function generator means of the monitoring means, said sign logic circuit enabling the production of said displace control signal as a function of the signs of the step signals (Su, Si).

12. A process computer system apparatus for detecting a fault and a fault direction in electric lines, wherein both the voltage and the current of the electric lines are successively sampled and respective voltage and current step signals (Su, Si) generated at each sampling, each pair of said step signals (Su, Si) defining a point in a Cartesian coordinate system, said Cartesian coordinate system including four quadrants and an origin, and successive pairs of said step signals (Su, Si) defining a line of motion progressing from one quadrant to a next adjacent quadrant, comprising;
a process peripheral consisting of a first input unit (EI) to which the voltage signals (Su) are applied and a second input unit (EII) to which the current step signals (Si) are applied;
an output unit (AG);
a memory (AS);
a central processing unit (CPU); and
at least one data link (DV) which connects the components (EI), (EII), (AG), (AS), (CPU);
said process computer system capable of monitoring in each of said quadrants the progression of the points defined by said step signals (Su, Si) from said one quadrant to said next adjacent quadrant by performing the following steps,
establishing in each of said quadrants a triggering boundary,
producing a fault signal when a point defined by said step signals (Su, Si) transgresses the triggering boundary of any quadrant,
establishing in each quadrant a boundary zone extending a predetermined depth from the triggering boundary of the respective quadrant to the origin,
detecting whenever a point defined by said step signals (Su, Si) enters into a boundary zone established in said establishing step;
displacing at least a section of a triggering boundary of said next adjacent quadrant whenever a point defined by said step signals is detected as entering into a boundary zone as detected in said detecting step, and
determining that a fault has occurred based upon making a detection in said detecting step and determining a fault direction based on the quadrants in which a fault detection is made.

* * * * *